United States Patent [19]

Fischer

[11] Patent Number: 4,697,839
[45] Date of Patent: Oct. 6, 1987

[54] FLEXIBLE PART-CENTERING PNEUMATIC GRIPPER

[75] Inventor: Kurt F. Fischer, Oxford, Mich.

[73] Assignee: General Motors Corporation, Detroit, Mich.

[21] Appl. No.: 935,713

[22] Filed: Nov. 28, 1986

[51] Int. Cl.[4] .............................................. B25J 15/10
[52] U.S. Cl. ................................. 294/115; 294/86.4; 294/88; 901/37; 901/39
[58] Field of Search ................... 294/86.4, 88, 97, 106, 294/115, 119.1; 269/156, 203, 238; 414/739, 744 A, 753; 901/31, 32, 36–39

[56] References Cited

U.S. PATENT DOCUMENTS

| 3,767,219 | 10/1973 | Fischer et al. | 269/238 X |
| 4,368,913 | 1/1983 | Brockmann et al. | 294/106 |
| 4,456,293 | 6/1984 | Panissidi | 294/106 |
| 4,627,654 | 12/1986 | Van Oost | 294/106 |

FOREIGN PATENT DOCUMENTS

| 69152 | 6/1977 | Japan | 294/115 |
| 2105676 | 3/1983 | United Kingdom | 294/106 |
| 812571 | 3/1981 | U.S.S.R. | 901/36 |

OTHER PUBLICATIONS

IBM Technical Disclosure Bulletin, vol. 24, No. 7B, Dec. 1981, "Gripper with Variable Gripping Angles", by Schaefer.

Primary Examiner—Johnny D. Cherry
Attorney, Agent, or Firm—Ernest E. Helms

[57] ABSTRACT

The present invention provides an end of arm tooling device (EOAT) for a robotic arm. The present invention may be adjusted to modify the gripping force exerted by the EOAT without a change of force by the actuator. The present invention also provides an EOAT which can be adjusted to handle workpieces of various dimensions and shapes.

8 Claims, 10 Drawing Figures

FLEXIBLE PART-CENTERING PNEUMATIC GRIPPER

FIELD OF THE PRESENT INVENTION

The field of the present invention is that of end of arm tooling devices (EOAT) for robots. More particularly the field of the present invention is that of robotic grippers.

BACKGROUND OF THE INVENTION

It is known to provide an EOAT to grip objects for robots. The common EOAT gripper has a linkage which is pivotally connected to a hydraulic or pneumatic actuator. Prior to the present invention, a change in the gripping force exerted by the gripper required a change in the force exerted by the actuator. The above mandates that the pneumatic or hydraulic system used for powering the actuator have a variable pressure system, therefore requiring a pressure regulator to give the desired actuator pressure. It is desirable to provide an EOAT gripper whose gripping force may be modified without changing the actuator force.

Another characteristic of EOAT grippers before the present invention is that most grippers are ideally suited to handle workpieces with regular polygonal cross sectional areas within a rather limited dimensional range. When changing dimensional sizes or changing workpiece shape, it is usually required to design another EOAT gripper. Therefore, the robot must be supplied with the separate EOAT gripper whenever the workpiece is dimensionally changed. It is desirable to provide an EOAT gripper which can easily be adjusted to handle workpieces in a wider dimensional range. It is also desirable to provide an EOAT gripper which can be used on workpieces having various cross sectional shapes, many of which do not have a regular polygonal cross sectional area.

SUMMARY OF THE INVENTION

To meet the above noted and other desires, the present invention is brought forth. The present invention provides an EOAT gripper having quadrangular linkage members with pivotally attached fingers which may be locationally adjusted with respect to the extendible rod of the gripper actuator. Therefore the EOAT gripper of the present invention may be readily adjusted to provide gripping forces of various amounts without a change in the force exerted by the actuator. In its preferred embodiment, the present invention provides an EOAT gripper which can be easily modified to be utilized on objects of various dimensions and shapes thereby reducing or eliminating the expense of custom tooling a separate EOAT gripper for each of the separate workpieces which the robot is handling.

It is an object of the present invention to provide an adjustable EOAT gripper. It is another object of the present invention to provide a method of adjusting an EOAT gripper as above described.

It is yet another object of the present invention to provide an adjustable workpiece centering end of arm tooling gripper adapted to be connected with a robot arm to grab a workpiece, the gripper including a plate having a plurality of slots, an actuator adjacent the plate having a flanged rod extendible with respect to the plate, a plurality of mounting guides locationally adjustable respectively fitted with the slots of the plate by bolts, a parallel linkage member pivotally connected with each of the mounting guides, a finger including a jaw plate pivotally connected with each of the parallel linkage members and a jaw adjustably mounted to the jaw plate, and an actuator link pivotally connected between each of the parallel linkage members and the flanged rod whereby movement of the rod causes the fingers to grab and locate the workpiece with respect to the rod.

It is still yet another object of the present invention to provide a method of changing the gripping pressure of an adjustable workpiece centering EOAT gripper with a plate having a plurality of slots and an actuator adjacent to the plate with a rod means extendible with respect to the plate, the gripper being connected with a robot arm to grip a workpiece, the method including locationally adjustably respectively fitting with the slots of the plate a plurality of mounting guides, pivotally connecting to the mounting guides a quadrangular linkage member, pivotally connecting to each of the quadrangular linkage members a finger, pivotally connecting with each of the quadrangular linkage members and the rod means an actuator link, and adjusting the location of the mounting guides on the plate whereby the gripping force exerted upon movement of the rod means is adjusted.

Other objects, desires and advantages of the present invention will become more apparent to those skilled in the art as the nature of the invention is better understood from the accompanying drawings and a detailed description.

DETAILED DESCRIPTION OF THE DRAWINGS

Figure 1:
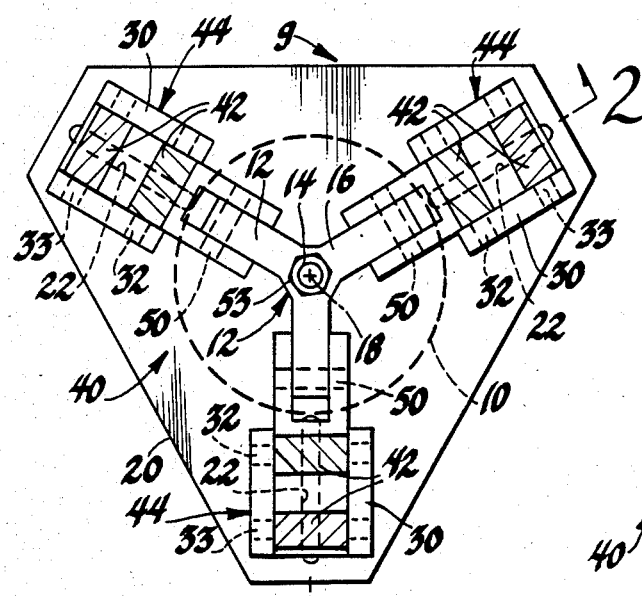
FIG. 1 is a top sectional view with portions in top elevation of a preferred embodiment of the present invention taken along line 1—1 FIG. 2.
Figure 2:
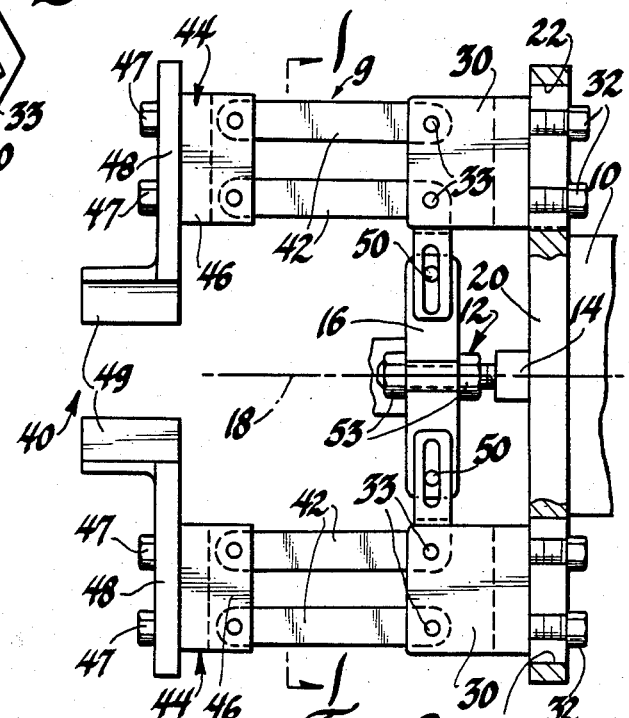
FIG. 2 is a sectional view mainly in front elevation with portions cut away taken along line 2—2 of FIG. 1.
Figure 3:
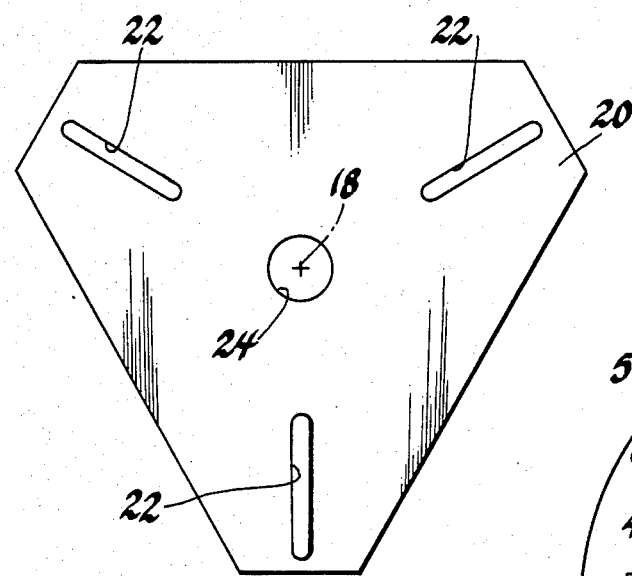
FIG. 3 is a top elevational view of the plate illustrated in FIG. 1.

Referring to FIGS. 1, 2 and 3, the adjustable workpiece centering EOAT gripper 9 of the present invention has four principle parts. The first part is the actuator 10 which will typically be a hydraulic or pneumatic cylinder. The actuator 10 will usually be integral with or attached to the robot arm (not shown). The actuator 10 has a rod 12 means comprising a cylindrical shaft 14 along with a fixably attached plate or flange 16 at its end. Adjacent to the actuator 10 and usually fixably connected thereto is the second major part, the plate 20. The plate has a plurality of slots 22. As illustrated in FIG. 3, the plate has three slots which project radially towards the center line 18 of the rod 14. A hole 24 is provided for the shaft 14. Shaft 14 is extendible with respect to the plate 20.

Locationally adjustably fitted with the slots 22 is a plurality of mounting guides 30, the third major part of gripper 9. The mounting guide 30 includes hold down bolts 32 so that the location of the mounting guide 30 can be adjusted with respect to slot 22 of the plate 20. To move the mounting guide 30 the hold down bolts 32 are loosened, the mounting guide 30 is then moved to its new location.

The fourth major item of the gripper is the parallel linkage finger assembly 40 which is pivotally connected with the mounting guide at points 33. The end of the parallel linkage members 42 opposite the plate 20 are pivotally connected to the fingers 44. As shown in FIGS. 1, 2 and 3 the fingers 44 include a jaw plate 46 pivotally connected to the parallel linkage members 42 and an adjustably mounted jaw 48. The location of the jaw 48 with respect to the jaw plate 46 may be adjusted by the loosening of adjustment bolts 47 and linearly adjusting the jaw to a new position with respect to the jaw plate 46.

Each of the parallel linkage members 42 through a pin and slot arrangement 50 is pivotally joined with the rod plate 16. In operation (from the position illustrated in FIG. 2) to open the fingers 44 in an outward direction to pick up a hollow cylindrical workpiece, the fingertips 49 are first lowered into the workpiece. The rod means 12 is then extended pushing the parallel linkage members 42 in an outward direction. If it is desirable to utilize the gripper to pick up a workpiece from the outside diameter of the workpiece, the fingertips 49 are placed to a position adjacent to the outside of the object, the rod means 12 is then retracted causing the fingertips 49 to grip the outside of the workpiece and to locate the workpiece with respect to the rod means 12.

The pivotal connections of the parallel linkage member 42 with the mounting guide 30 and the finger 44 form a parallelogram. Therefore, gripper 9 is a parallel motion gripper, meaning that the gripper fingers 44 always move in a parallel plane in relationship to one another. However it is possible to utilize the present invention in an angular gripper by replacing the parallel linkage members 42 with quadrangular linkage members uneven in length. It is also apparent to those knowledgeable in the art that the parallel linkage finger assembly 40 may be made more sturdy by having dual parallel linkage members 42 side by side as illustrated in FIG. 4 (item 41).

To adjust the gripper 9 to externally grip objects of a greater diameter, the hold down bolts 32 are untorqued, the mounting guides 30 are then moved in the slot and the hold down bolts 32 are then retorqued with the mounting guide 30 in its new position. A simpler method to adjust the gripper 9 for workpieces of a different diameter is to adjust the position of the jaws 48 in relation to the jaw plate 46. It will be apparent to those familiar with the art that the movement of the mounting guides 30 radially inward or outwardly from the center line 18 of the rod will change the gripping force exerted by the gripper 9. Therefore when desiring to increase the gripping force exerted by the gripper 9 (when grabbing the outside diameter of the workpiece) the mounting guides 30 are moved outwardly and the jaws 48 with relationship to the jaw plate 46, are moved inward to retain the same gripping diameter (if desired). An increase in gripping force can also be accomplished by adjusting the jaws 48 inwardly so that the parallel linkage members 42 are further from being perpendicular to the plate 20 (when contacting the workpiece) and leaving the mounting guides 30 in the same position. Still another manner that the force can be changed is by adjusting the position of rod plate 16 on shaft 14 with the two jaw nuts 53.

Figure 4:
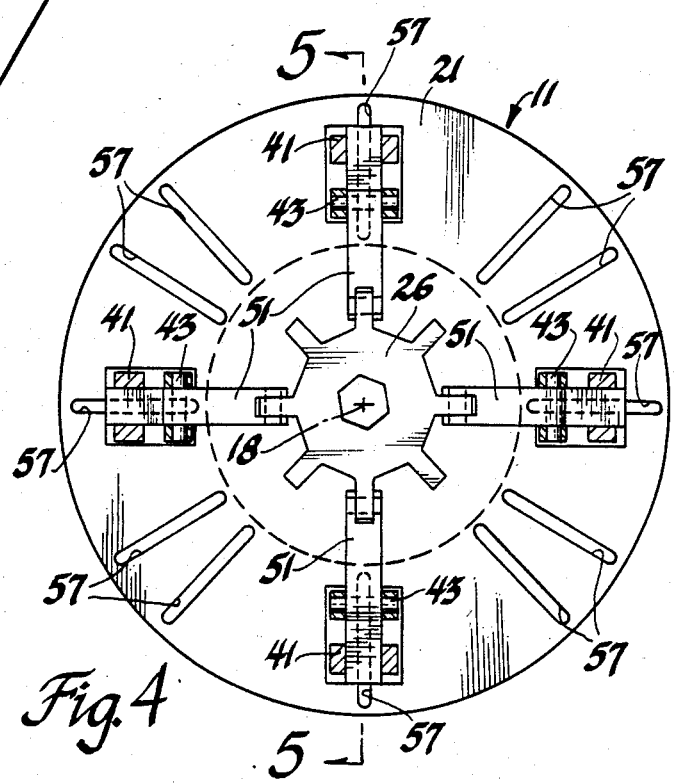
FIG. 4 is a sectional view of an alternative embodiment of the present invention taken along line 4—4 of FIG. 5.
Figure 5:
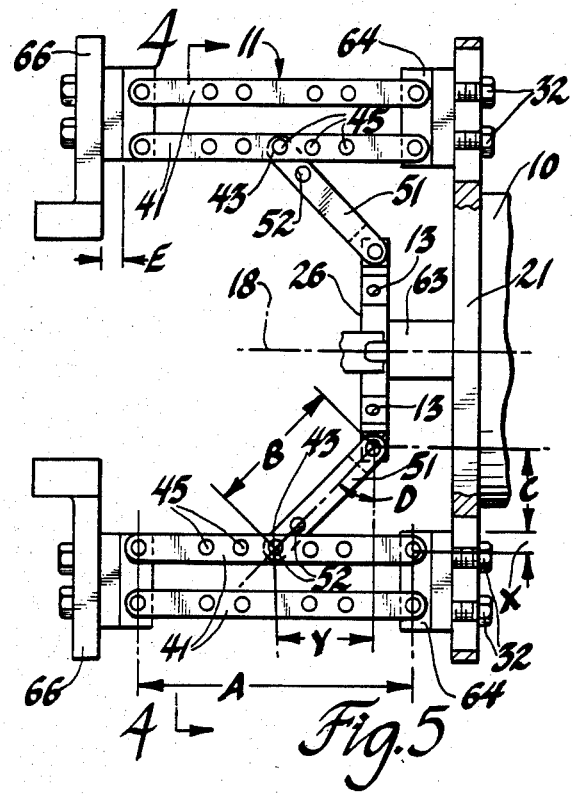
FIG. 5 is a sectional view with portion cut away taken along line 5—5 of FIG. 4.

Referring to FIGS. 4 and 5, an alternative embodiment gripper 11 has a rod plate 26 pivotally connected with an actuator links 51. The actuator link 51 is pivotally connected with the parallel linkage members 41. The gripping force of gripper 11 may be readily modified by adjusting the point of connection 43 of the actuator link with the parallel linkage members 41 which are provided with a plurality of adjustment apertures 45. Depending on space availability, actuator link 51 can be extended with a series of apertures 52 allowing the actuator link 51 to pivotally connect with parallel linkage members 41 at various positions.

The gripping force (F) for gripper 11 assuming frictional forces are negligible is:

$$F = \frac{P \cdot S \cdot Y}{N \cdot A} \cdot \left[ \cot \left[ \arccos \left[ \frac{(C + X) - (B \cdot \cos D)}{Y} \right] \right] + \cot D \right]$$

P = Fluid pressure into the actuator
S = Area of the actuator diaphragm (or piston)
A = Length between the pivot points of parallel linkage member with the finger and mounting guide
B = Effective length of the actuator link
C = Radial distance from the rod plate pivotal attachment with the actuator link to the pivot point of the parallel linkage member with the mounting guide when the mounting guide is at an innermost position
X = Adjustment distance of the mounting guide from its innermost position
Y = Length between the pivotal attachment of parallel linkage member with the actuator link and mounting guide
D = Angle of actuator link with respect with a line perpendicular with the directional centerline of the rod
N = Number of parallel linkage finger assemblies The above equation is for a gripper with parallel linkage members and plate slots which project radially towards the rod centerline.

One advantage of gripper 11 is that the force F is totally independent of the dimension E (thickness of the jaw plate). Therefore the fingers can be lengthened or shortened axially along centerline 18 without effecting gripping force.

It will also be apparent to those skilled in the art that the gripping force can be readily modified by pivotally connecting actuator link 51 to a different aperture 13 of rod plate 26.

Figure 6:
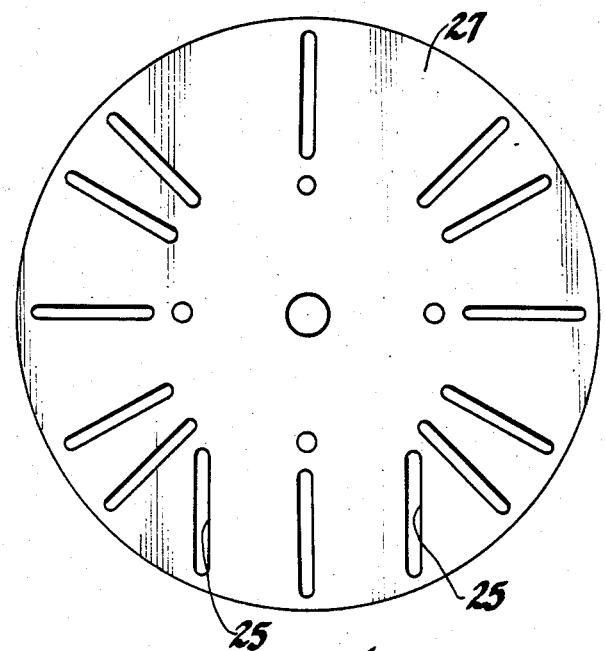
FIG. 6 is a top elevational view of an alternative embodiment to the plate illustrated in FIG. 4.
Figure 7:
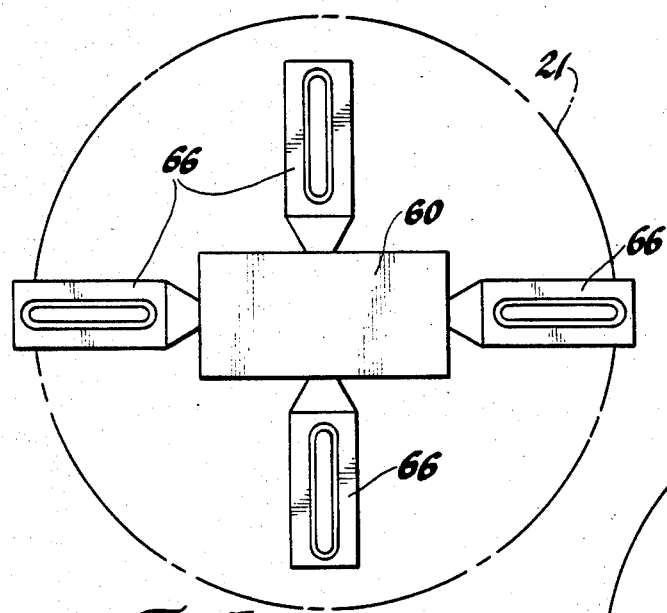
FIGS. 7 and 8 are schematic top elevational views illustrating the location of the various linkage members when holding workpieces with non regular polygonal cross sectional areas.
Figure 8:
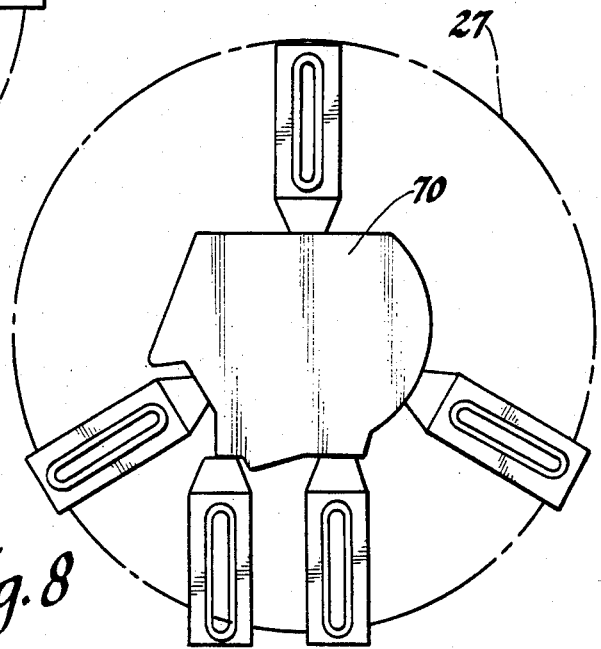

The plate 21 (FIG. 4) has slots 57 in a geometric pattern which allows for geometrically positioning square or octagonal cross sectional pieces, or triangular and hexagonal pieces. When handling workpiece 60 with elongated rectangular cross sectional areas (FIG. 7) two of the linkage finger assemblies 66 are radially adjusted outward to accommodate the larger dimension of the workpiece. An alternative to the plate illustrated in FIG. 4 is shown in FIG. 6. Plate 27 has non-radially projecting slots 25 which are very useful when handling an irregular shaped workpiece 70 as shown in FIG. 8.

Figure 9:
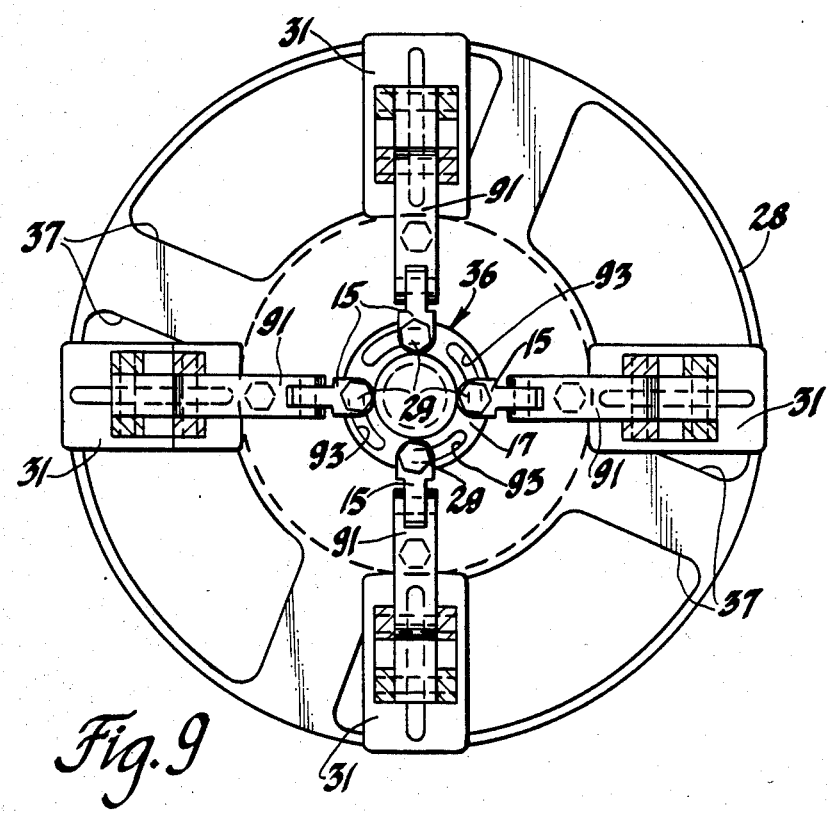
FIG. 9 is a top sectional view taken along line 9—9 of FIG. 10 of an alternative embodiment of the present invention.
Figure 10:
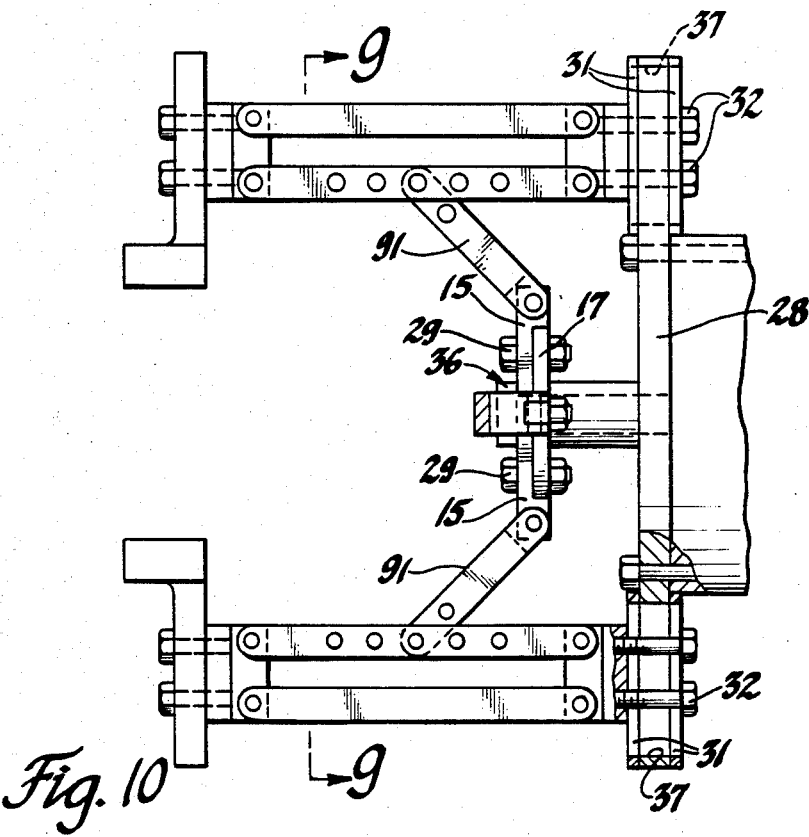
FIG. 10 is a sectional view mainly in front elevation of the embodiment shown in FIG. 9 with two of the linkage members removed for clarity of illustration.

Another alternative embodiment is shown in FIGS. 9 and 10. Plate 28 has four widened slots 37 which allow for more possible positions for the fingers. Sandwich plates 31 clamp on to plate 28 with hold down bolts 32. Rod 36 has a rod plate 17 with a series of grooves 93. Connector piece 15 attaches actuator link 91 with rod plate 17. Bolt 29, fitted within groove 93, adjustably attaches connector piece 15 with the rod plate 17.

The present invention provides a method of changing the gripping pressure of an adjustable workpiece centering EOAT gripper 11 with a plate 21 having a plurality of slots and an actuator 10 adjacent to the plate with a rod means 63 extendible with respect to the plate 21, the gripper 11 being connected with a robot arm to grip a workpiece, the method including the following steps:

1. Locationally adjustably respectively fitting within the slots 57 of the plate 21 a plurality of mounting guides 64;
2. Pivotally connecting to the mounting guides 64 parallel linkage members 41;
3. Pivotally connecting to each of the parallel linkage members 41 a finger 66;
4. Pivotally connecting with each of the parallel linkage members 41 and said rod means 63 an actuator link 51; and
5. Adjusting the location of said mounting guides 64 on said plate 21 whereby the gripping forces exerted upon movement of said rod means 63 are adjusted.

While a few of the embodiments of the present invention have been explained it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. An adjustable workpiece centering end of arm tooling gripper adapted to be connected with a robot arm to grab a workpiece, said gripper in combination comprising:
    a plate having a plurality of slots;
    an actuator adjacent said plate having rod means extendible with respect to said plate;
    a plurality of mounting guides locationally adjustably respectively fitted with said slots of said plates;
    a quadrangular linkage member pivotally connected with each of said mounting guides and being pivotally and slotably connected with said rod means;
    a finger pivotally connected with each of said quadrangular linkage members whereby movement of said rod means causes said fingers to grab and locate the workpiece with respect to said rod means.

2. A gripper as described in claim 1 wherein said quadrangular linkage member, said mounting guide and said finger pivotal connections form a parallelogram.

3. An adjustable workpiece centering end of arm tooling gripper adapted to be connected with a robot arm to grab a workpiece, said gripper in combination comprising:
    a plate having a plurality of slots;
    an actuator adjacent said plate having rod means extendible with respect to said plate;
    a plurality of mounting guides locationally adjustably respectively fitted with said slots of said plate;
    a quadrangular linkage member pivotally connected with each of said mounting guides;
    a finger pivotally connected with each of said quadrangular linkage members; and
    an actuator link pivotally connected between each of said quadrangular linkage members and said rod means whereby movement of said rod means causes said fingers to grab and locate the workpiece with respect to said rod means.

4. A gripper as described in claim 3 wherein said quadrangular linkage member, said mounting guide and said finger pivotal connections form a parallelogram.

5. A gripper as described in claim 3 wherein at least one of said slots in said plate extends in a nonradial fashion with respect to said rod means.

6. A gripper as described in claim 3 wherein said finger includes a jaw plate pivotally connected with said quadrangular linkage member and a jaw adjustably mounted to said jaw plate.

7. An adjustable workpiece centering end of arm tooling gripper adapted to be connected with a robot arm to grab a workpiece, said gripper in combination comprising:
    a plate having a plurality of slots;
    an actuator adjacent said plate having a flanged rod extendible with respect to said plate;
    a plurality of mounting guides locationally adjustably respectively fitted with said slots of said plate by bolts;
    a parallel linkage member pivotally connected with each of said mounting guides;
    a finger including a jaw plate pivotally connected with each said parallel linkage members and a jaw adjustably mounted to said jaw plate; and
    an actuator link pivotally connected between each of said parallel linkage members and said flanged rod whereby movement of said rod causes said fingers to grab and locate the workpiece with respect to said rod.

8. A method of changing the gripping pressure of an adjustable workpiece centering EOAT gripper with a plate having a plurality of slots and an actuator adjacent to said plate with a rod means extendible with respect to said plate, said gripper being connected with a robot arm to grab a workpiece, said method in combination comprising:
    locationally adjustably respectively fitting with said slots of said plate a plurality of mounting guides;
    pivotally connecting to said mounting guides a quadrangular linkage member;
    pivotally connecting to each said quadrangular linkage members a finger;
    pivotally connecting with each of said quadrangular linkage members and said rod means an actuator link; and
    adjusting the location of said mounting guides on said plate whereby the gripping force exerted upon movement of said rod means is adjusted.

* * * * *